UNITED STATES PATENT OFFICE.

HOWARD SPENCE, OF MANCHESTER, ENGLAND.

PROCESS OF PRODUCING TITANIUM COMPOUNDS.

SPECIFICATION forming part of Letters Patent No. 681,993, dated September 3, 1901.

Original application filed June 3, 1899, Serial No. 719,299. Divided and this application filed December 23, 1899. Serial No. 741,439. (No specimens.)

*To all whom it may concern:*

Be it known that I, HOWARD SPENCE, a subject of the Queen of Great Britain and Ireland, residing at Manchester, in the county of Lancaster, England, have invented Improvements in Processes of Producing Titanium Compounds, of which the following is a specification.

Hitherto no soluble compound of titanium has been produced on a large scale as an article of commerce and the laboratory processes which have been described are not suitable for the production of such compounds except at a price which would be, practically speaking, prohibitive.

Now this invention relates to the production of soluble compounds of titanium having the general formula $TiO_2, 2(SO_3), X_2O$ where X represents either sodium, potassium, or ammonium, $(NH_4.)$ From these soluble and industrially useful compounds of titanium (respectively, a crystalline compound of titanic acid, sulfuric acid, and soda, a crystalline compound of titanic acid, sulfuric acid, and potash, and a crystalline compound of titanic acid, sulfuric acid, and ammonia) various other useful compounds of titanium may also be produced. It should be noted that the potash salt differs from the well-known compound of titanic acid, sulfuric acid, and potash mentioned in the text-books, the formula of the latter being $TiO_2, 3(SO_3), K_2O$, while that of the former is $TiO_2, 2(SO_3), K_2O$.

In carrying out this invention the titanic acid may be obtained from any suitable material containing titanic acid, provided that it exists therein in a form readily soluble in sulfuric acid or that it has been so rendered soluble by a preliminary treatment, such as by fritting or fusing with carbonate of soda, as is described in my application, Serial No. 719,299, filed June 3, 1899, of which this application is a division, and provided that iron or other impurities are not present in detrimental quantities. Should this be the case, they may be removed by any known or suitable method, depending upon the particular substance being treated. The said material is then digested in heated sulfuric acid, (either in the open or under pressure,) the quantity of sulfuric acid employed being in excess of what is actually required for the solution of the titanic acid. The strength of the sulfuric acid employed will necessarily vary with the character of the particular titanic-acid-containing material under treatment; but the acid must be in excess only to the limited extent necessary to maintain the titanic acid in solution. To the solution of titanic acid in sulfuric acid obtained as above described and then separated by any suitable means from the insoluble matter there is added sulfate of the particular alkali to be employed—*i. e.*, either sulfate of soda, sulfate of potash, or sulfate of ammonia—preferably in the form of neutral or normal sulfate, such as neutral sodium sulfate, $(Na_2SO_4,)$ the quantity added being sufficient to potentially form some or all of the free or uncombined sulfuric acid present into an acid sulfate or bisulfate of the alkali. Thus for every molecule of titanic acid in solution there is added at least one molecule of alkali sulfate. If, for example, the solution contains about twenty per cent. of free sulfuric acid and about sixteen per cent. of titantic acid, then for every one hundred parts, by weight, of the solution we may add about fifty parts, by weight, of sodium sulfate when producing the sodium titanium double sulfate. At this stage, as also in the case of the solution produced by attacking the material with the acid sulfate, as described in my other application aforesaid, the solution is concentrated by evaporation—*i. e.*, by boiling the solution in the ordinary way until it has acquired a specific gravity of about 1.4, the temperature at this stage being about 110° centigrade, whereby a separation is effected of the crystalline compound of titanic acid, sulfuric acid, and the alkali employed. The crystalline compounds separate out mainly during concentration of the solution obtained by the above-described methods. If the solution contains impurities in such proportion as to be detrimental, the crystalline crop of the compound may be removed by well-known means from the liquor while the latter is hot. If, however, the solution is comparatively pure, it may be allowed to cool in order to obtain as large a yield as possible of the compound. It is to be noted that the presence of a considerable proportion of alumina in the material containing titanic acid is objectionable, as it interferes largely with the separation of the crystalline compound. If present in large proportion, it would very greatly reduce the quantity obtainable. The product thus obtained may be further purified, if necessary, by dissolving it in dilute sulfuric acid of about 1.2 specific gravity, concentrating the solution so obtained as before, and again crystallizing out the compound. It is found that this result is greatly assisted by the addition of sufficient neutral or normal sulfate of the alkali employed to convert potentially into an acid sulfate some or all of the sulfuric acid that has been added in the form of dilute acid, as above described. The addition of sufficient neutral sulfate of the alkali to potentially form about two-thirds of the sulfuric acid so added into an acid sulfate or bisulfate ($NaHSO_4$ or $KHSO_4$ or $NH_4HSO_4$) is a proportion found to give a good result.

The following is an example of the process according to this invention: Eighty grams of finely-powdered native rutile were intimately mixed with one hundred and seven grams of soda-ash (fifty-eight per cent. alkali) and placed in a muffle, which was gradually heated to a dull-red heat during the first hour. The heat was then gradually increased till a bright red was attained, the frit being frequently stirred to prevent baking together. This heat, which was the limit attained without fusion of the mass, was maintained for about three hours. The mass was then allowed to cool, crushed, and lixiviated in four hundred cubic centimeters of hot water in order to remove as much of the soda as possible, and was separated from the liquor on a vacuum-filter, on which the residue was further washed. On removal from the filter the mass weighed one hundred and eight grams. It was then treated with two hundred and forty grams of strong sulfuric acid (1.86 specific gravity) that had been previously mixed with one hundred cubic centimeters of water and the whole heated in a glass vessel over a flame for a few minutes, then another one hundred cubic centimeters of warm water were added gradually to the solution and the heating continued for a further five minutes. The solution was then filtered from the insoluble silica and other matter on an asbestos cloth and the insoluble matter washed with one hundred cubic centimeters of cold water, this liquor being added to the main filtrate. To the clear filtrate thus obtained two hundred and ninety grams of $Na_2SO_4.10H_2O$ were added and the liquor brought to the boil. In this case, the liquors having been kept strong, a rich crop of the compound separated out without further evaporation being previously necessary and the crop was thoroughly washed with a large quantity of cold water (about five hundred cubic centimeters) on a filter-pump. As the crystals, especially when formed on a small scale, are very small and retain impurities readily, a large quantity of water for washing should be used.

The soluble crystalline compound of titanic acid, sulfuric acid, and of the alkali employed is in a very suitable form for use in the arts as a soluble titanium compound—such, for example, as a mordant for colors—and is also suitable for the preparation (by well-known methods of chemical reaction or of double decomposition) of other useful compounds of titanium.

What I claim is—

1. The herein-described process for the production of new soluble compounds of titanic acid, sulfuric acid and alkali having as set forth the formula $TiO_2 2(SO_3) X_2O$ from a titanic-acid-containing substance in which the titanic acid is readily soluble in sulfuric acid, which consists in digesting the titanic-acid-containing substance in heated sulfuric acid in slight excess and maintaining in the liquor an excess of sulfuric acid to the limited extent necessary to retain the titanic acid in solution, adding to the clear solution of the titanic acid in sulfuric acid, sulfate of the particular alkali employed in the proportion of not less than one molecule of alkali sulfate for every molecule of titanic sulfate contained in solution, and crystallizing out the resulting compound of titanic acid, sulfuric acid and alkali by evaporating the said clear solution to a specific gravity of about 1.4.

2. The herein-described process for the production of new soluble compounds of titanic acid, sulfuric acid and alkali having as set forth the formula $TiO_2 2(SO_3) X_2O$ which consists in dissolving titanic acid in heated dilute sulfuric acid, such sulfuric acid being in excess of what is actually required for the solution of the titanic acid, adding an alkaline sulfate to the resulting solution, crystallizing out the resulting compound of titanic acid, sulfuric acid and alkali, dissolving the crystallized compound in dilute sulfuric acid adding normal sulfate of the alkali employed to the resulting solution, and again crystallizing out the compound of titanic acid, sulfuric acid and alkali.

3. The herein-described process for the production of new soluble compounds of titanic acid, sulfuric acid and alkali having as set forth the formula $TiO_2 2(SO_3) X_2O$ which consists in dissolving titanic acid in heated dilute sulfuric acid such dilute sulfuric acid being in excess of what is actually required for the solution of the titanic acid, adding an alkaline sulfate to the resulting solution, crystallizing out the resulting compound of titanic acid, sulfuric acid and alkali, dissolving the crystallized compound in dilute sulfuric acid, adding normal sulfate of the alkali employed to the resulting solution, and again crystallizing out the compound of titanic acid, sulfuric acid and alkali.

Signed at Manchester, county of Lancaster, England, this 1st day of December, 1899.

HOWARD SPENCE.

Witnesses:
 FRED BERRY,
 ARTHUR WILDING.